(12) United States Patent
Choudhary et al.

(10) Patent No.: US 10,853,253 B2
(45) Date of Patent: Dec. 1, 2020

(54) METHOD AND SYSTEMS FOR MASTER ESTABLISHMENT USING SERVICE-BASED STATISTICS

(71) Applicant: Oracle International Corporation, Redwood Shores, CA (US)

(72) Inventors: Dungara Ram Choudhary, Fremont, CA (US); Yu Kin Ho, Fremont, CA (US); Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 92 days.

(21) Appl. No.: 15/252,076

(22) Filed: Aug. 30, 2016

(65) Prior Publication Data

US 2018/0060236 A1    Mar. 1, 2018

(51) Int. Cl.
*G06F 12/08* (2016.01)
*G06F 12/0817* (2016.01)
(Continued)

(52) U.S. Cl.
CPC ........ *G06F 12/0817* (2013.01); *G06F 9/4418* (2013.01); *G06F 11/3034* (2013.01); *G06F 11/34* (2013.01); *G06F 11/3452* (2013.01); *G06F 11/3471* (2013.01); *G06F 12/0842* (2013.01); *G06F 12/0862* (2013.01); *G06F 12/145* (2013.01); *G06F 16/284* (2019.01);
(Continued)

(58) Field of Classification Search
CPC .......... G06F 11/34; G06F 12/08; G06F 17/30; G06F 9/4418; G06F 12/0862; G06F 12/0842; G06F 12/0817; G06F 11/3471; G06F 11/3452; G06F 12/145; G06F 11/3034; G06F 16/284
USPC ........................................................ 711/145
See application file for complete search history.

(56) References Cited

U.S. PATENT DOCUMENTS 6,272,491 B1    8/2001  Chan et al.
6,389,513 B1 *  5/2002  Closson .............. G06F 12/0813
                                                   707/999.008
(Continued)

OTHER PUBLICATIONS

S. M. Blott et al., "User-level billing and accounting in Ip networks," in Bell Labs Technical Journal, vol. 4, No. 4, pp. 237-251, Oct.-Dec. 1999.*

(Continued)

*Primary Examiner* — Pierre Miche Bataille
(74) *Attorney, Agent, or Firm* — Hickman Palermo Becker Bingham LLP

(57) ABSTRACT

A method and apparatus are described for assigning mastership of nodes to data blocks. A method involves connecting each session of a plurality of sessions to a particular node of a cluster of nodes based on services associated with the plurality of sessions. Each session of the plurality of sessions is associated with a respective service of a plurality of services. The method also involves collecting service-based access statistics aggregated by service and ranges of data block addresses. Each range corresponds to one or more contiguous subrange of data block addresses. The method further involves assigning mastership of the nodes to the data blocks having addresses within said ranges of data block addresses based on services associated with the nodes and the service-based access statistics.

16 Claims, 5 Drawing Sheets

(51) Int. Cl.
*G06F 16/28* (2019.01)
*G06F 11/34* (2006.01)
*G06F 9/4401* (2018.01)
*G06F 12/0862* (2016.01)
*G06F 11/30* (2006.01)
*G06F 12/0842* (2016.01)
*G06F 12/14* (2006.01)

(52) U.S. Cl.
CPC .. *G06F 2201/80* (2013.01); *G06F 2212/1016* (2013.01); *G06F 2212/465* (2013.01); *G06F 2212/507* (2013.01); *G06F 2212/6026* (2013.01); *G06F 2212/6042* (2013.01); *G06F 2212/621* (2013.01)

(56) References Cited

U.S. PATENT DOCUMENTS

| | | | |
|---|---|---|---|
| 6,529,906 B1 | 3/2003 | Chan | |
| 7,039,669 B1 | 5/2006 | Wong et al. | |
| 7,080,075 B1 | 7/2006 | Chan et al. | |
| 7,379,952 B2 | 5/2008 | Chan et al. | |
| 7,389,293 B2 | 6/2008 | Chan et al. | |
| 9,317,435 B1* | 4/2016 | Bairavasundaram | ........................ G06F 12/0862 |
| 9,692,820 B2* | 6/2017 | Chaudhary | ............ G06F 9/5011 |
| 10,001,983 B2* | 6/2018 | Roy | ........................ H04L 67/34 |
| 2005/0027796 A1 | 2/2005 | San Andres | |
| 2005/0091215 A1 | 4/2005 | Chandra | |
| 2008/0065644 A1* | 3/2008 | Pasupuleti | .......... G06F 16/2477 |
| 2009/0144388 A1* | 6/2009 | Gross | ................. G06F 12/0813 709/213 |
| 2013/0332484 A1* | 12/2013 | Gajic | ...................... G06F 16/21 707/770 |
| 2013/0339550 A1* | 12/2013 | Rangaraman | ........... H04L 69/00 709/245 |
| 2014/0344523 A1* | 11/2014 | Samanta | ............... G06F 12/084 711/130 |
| 2014/0351523 A1* | 11/2014 | Samanta | ................... G06F 3/06 711/130 |
| 2015/0280959 A1* | 10/2015 | Vincent | ............... G06F 16/1774 709/203 |
| 2015/0363319 A1* | 12/2015 | Qi | ........................ G06F 3/0619 711/121 |
| 2016/0019253 A1 | 1/2016 | Chan et al. | |
| 2016/0070726 A1 | 3/2016 | Macnicol | |
| 2016/0352665 A1 | 12/2016 | Nielsen | |
| 2017/0017574 A1* | 1/2017 | Deng | ................. G06F 12/0862 |
| 2017/0017680 A1 | 1/2017 | Jaakola | |
| 2018/0096010 A1 | 4/2018 | Mukherjee | |

OTHER PUBLICATIONS

Luis Miguel Torres, E. Magaña, M. Izal and D. Morato, "Identifying sessions to websites as an aggregation of related flows," 2012 15th International Telecommunications Network Strategy and Planning Symposium (NETWORKS), Rome, 2012, pp. 1-6.*
Oracle® Automatic Storage Management, "Administrator's Guide", 12c Release 1 (12.1), dated May 2015, 620 pages.
Patterson, R. H. 'Informed Prefetching and Caching,' Proceedings of the Fifteenth ACM Symposium on Operating Systems Principles Copper Mountain, Colorado, USA: ACM. (1995) pp. 79-95.
Mukherjee, U.S. Appl. No. 15/281,718, filed Sep. 30, 2016, Notice of Allowance, dated Jun. 26, 2019.
Mukherjee, U.S. Appl. No. 15/281,718, filed Sep. 30, 2016, Office Action, dated Mar. 6, 2019.

* cited by examiner

METHOD AND SYSTEMS FOR MASTER ESTABLISHMENT USING SERVICE-BASED STATISTICS

CROSS-REFERENCE TO RELATED APPLICATIONS

This application is related to U.S. Pat. No. 7,379,952, entitled "Techniques For Multiple Window Resource Remastering Among Nodes Of A Cluster", the entire contents of which is hereby incorporated by reference for all purposes as if fully set forth herein.

This application is related to U.S. Pat. No. 7,080,075, entitled "Dynamic Remastering For A Subset Of Nodes In A Cluster Environment", the entire contents of which is hereby incorporated by reference for all purposes as if fully set forth herein.

This application is related to U.S. Pat. No. 7,389,293, entitled "Remastering For Asymmetric Clusters In High-Load Scenarios", the entire contents of which is hereby incorporated by reference for all purposes as if fully set forth herein.

This application is related to U.S. Pat. No. 6,272,491, entitled "Method And System For Mastering Locks In A Multiple Server Database System", the entire contents of which is hereby incorporated by reference for all purposes as if fully set forth herein.

This application is related to U.S. Pat. No. 6,529,906, entitled "Techniques For DLM Optimization With Re-Mastering Events", the entire contents of which is hereby incorporated by reference for all purposes as if fully set forth herein.

This application is related to U.S. Pat. No. 7,039,669, entitled "Techniques For Adding A Master In A Distributed Database Without Suspending Database Operations At Extant Master Sites", the entire contents of which is hereby incorporated by reference for all purposes as if fully set forth herein.

FIELD OF THE INVENTION

The present invention relates generally to computer systems and data processing, and more specifically to systems and methods for master establishment of nodes and buffer cache warm up based on service accesses.

BACKGROUND

Database management systems (DBMS) store database data in data blocks of data files stored in persistent storage. To read and/or modify data in the data block, a DBMS reads a copy of the data into a buffer in a buffer cache that resides in RAM (Random Access Memory), such as volatile RAM. A buffer cache stores copies of data blocks read from data files. In general, a DBMS database system typically stores data in a cheaper high latency non-volatile memory (e.g., disk) for data persistence as well as to more affordably store large volumes of data.

In general, buffer caches can only hold a portion of the data blocks of a database. To enhance efficient access, buffer caches are managed so that data blocks that are most likely to be read are the most likely to be stored and retained in buffer caches.

The increasing volume of data and online analytical processing (OLAP) and data as a service (DaaS) services has accelerated deployments of database systems with higher storage, RAM, and flash memory capabilities. It takes significant time to (re)populate buffer caches in the event of service startup and/or relocation and causes decreased throughput and increased response time. The problem is even more pronounced in cloud systems due to their dynamic nature. For example, in a cloud system, services are frequently started on new nodes and relocated between nodes to perform planned upgrade and/or maintenance and to optimize utilization of the resources.

Database systems would benefit from an efficient method of proactively populating caches at startup and/or relocation with data blocks, and populating the caches with data blocks most likely to be read after start up.

Many DBMSs are multi-node DBMSs comprising multiple database servers (database instances) that manage access to a database. Each node comprises a database instance running on one or more processors, which are coupled to a RAM memory. Each node can access the same data blocks of a database. To coordinate access to the data blocks, locks are used to grant levels of access to a data block.

Specifically, for a node to access a data block and read the data block into a buffer cache of the node, a lock is first obtained by the node. The lock is obtained from a node that is a master of the data block. A master is responsible for managing locks on a set of data blocks of a database. A master of a data block may be referred to herein as the owner of the data block.

In a multi-node DBMS, mastership of data blocks of a database is divided among the nodes. The master of a set of data blocks receives requests for locks on any of the set of data blocks, grants requested locks, and tracks which nodes have locks on which data blocks.

A request for a lock made by a node is made by a process running on the node. A process running on a node may request a lock on a data block owned by the node or owned by another node. When the data block is owned by another node, a request for a lock requires inter-node communication, which delays the handling of the lock request. For at least this reason, a node may access a data block more quickly when the data block is mastered by the node. In addition, access to data blocks may be made more efficient system-wide when mastership of a set of blocks is assigned to a master that, relative to another node, accesses the set more frequently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
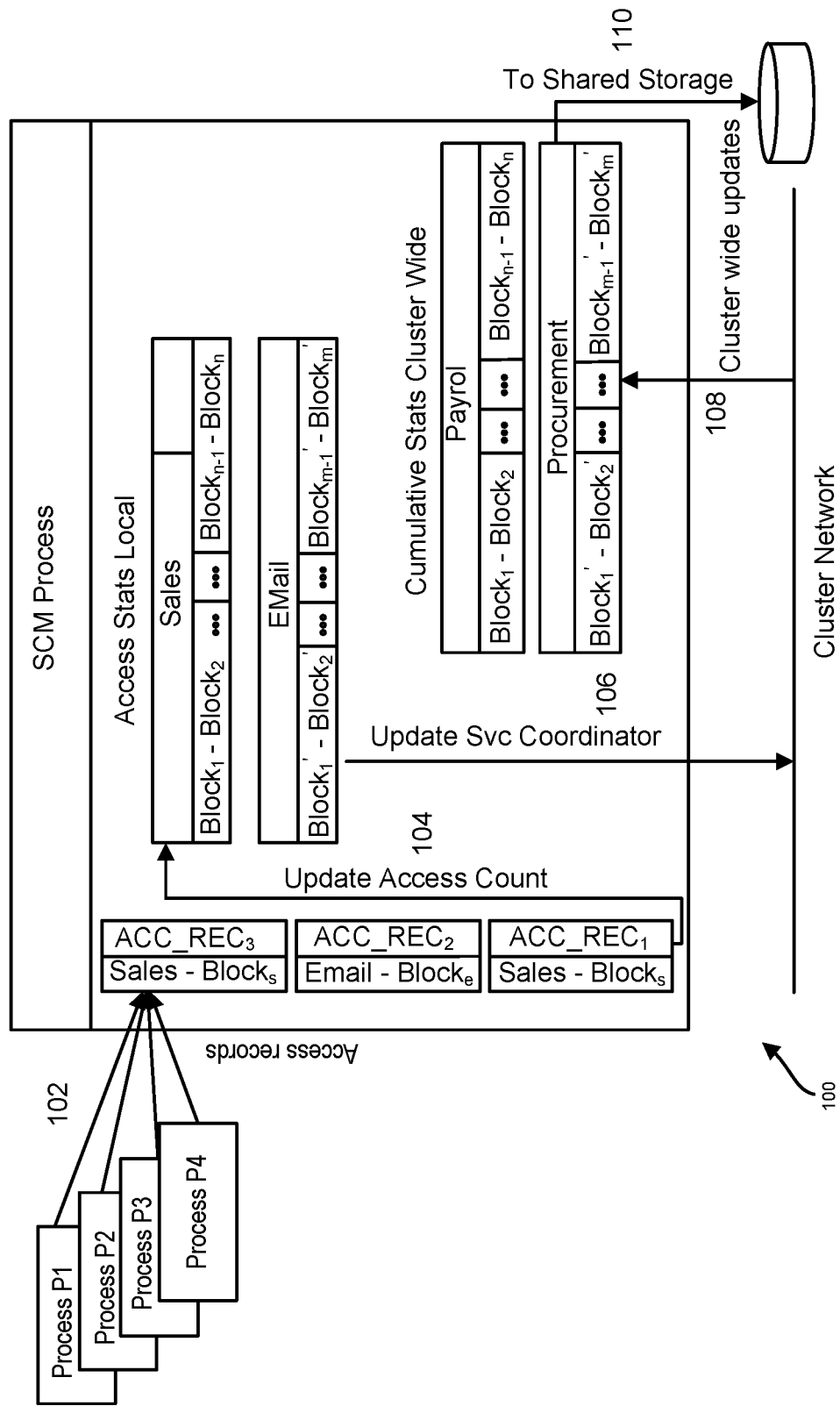
FIG. 1 is an illustration of an exemplary method for collecting, managing, and storing service-based access statistics (i.e., statistics collection and management (SCM))

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches are described herein for populating upon startup the buffer caches of nodes of multi-node DBMS with data blocks determined to be most frequently accessed by the nodes. In addition, mastership of data blocks is assigned to the nodes so that each node owns data blocks the node accesses more frequently than other nodes. These approaches are accomplished by tracking access to data blocks made by services running on the nodes.

Services are associated with sessions running on a DBMS. Services can be defined in a data dictionary using data definition language (DDL) statements. To establish a session on a DBMS, a client requests a session. The request for the session may specify a service. Such a request is referred to herein as a request for the service. Services may also be assigned in other ways, for example, based on user authentication at the client device. The DBMS directs requests for a service to a node that has been assigned to running that service. This node is also referred to as running or hosting the service. A service can be hosted by more than one node and a node can host multiple services.

A node hosting a service tends to access a certain set of data blocks in a database and not access other sets of data blocks in the database. A reason for this is that services are often defined according to applications. An application tends to access data blocks holding data for tables used by the application and not access data for tables not used by the application. Consequently nodes hosting a service tend to access the data blocks storing data for respective applications of the service and tend not to access data blocks storing data for applications of other services.

When a node tends to access a certain set of data blocks more than other nodes, the node is referred to as having an affinity for that set of data blocks. Similarly, when a node tends access the certain data blocks for sessions of a service more than other data blocks of the database, the service is referred to as having an affinity for the certain set of data blocks. Thus, a node hosting a service may have an affinity for data blocks for which the service has an affinity.

Mastership of a node over data blocks for which the node has an affinity reduces the inter-node interaction needed for locking data blocks, thereby improving efficient buffer caching and data block access. Importantly, because a node hosting a service may have an affinity for the data blocks for which the service has an affinity, mastership by the node over these data blocks also reduces the inter-node interaction needed for locking data blocks and improves efficient buffer caching and data block access.

According to an embodiment, access by sessions to data blocks is tracked by service. This information is used to determine which services may have an affinity for which data blocks. Based on this information, upon startup, a node hosting a service may be assigned mastership over data blocks for which the information shows that the service has an affinity. When determining mastership at other times, this information may be used in this way.

In addition, at start up, the buffer cache of a node hosting a service may be populated with the data blocks for which the information shows that the service has an affinity. As a result, the data blocks in a database mostly likely to be accessed by the node are already in the buffer cache, increasing the chance of cache hits.

DBMS Overview

Embodiments of the present invention are used in the context of database management systems. Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at a client device submits, via a database client, a database command to a database server instance with which the database client maintains a connection. A user may be one or more applications running on the client device that cause the database client to interact with a database server instance. Multiple parties may access database resources through a given application. Multiple parties and/or users may also be referred to herein, collectively, as a user.

In order for a client to interact with a database server, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session is established, temporary variable values generated by processes executing software within the database session, and a service associated with the session.

As mentioned above, a session may be associated with a service. A service is assigned, at run-time, to a node in order to have the node host the service. A service may also be associated with service-level agreements, which are used to assign a number nodes to services and allocate resources within nodes for those services.

Service activity can be tracked to measure affinity. When a service accesses a data block having an address within a range of data block addresses, the access may be tracked by way of service-based access statistics to measure the affinity between the service and the range. Greater access frequency may correlate to greater affinity. Affinity may be measured, for each range, by dividing the total accesses by the services for the range by a cumulative number of accesses by the service for all ranges in a region of address spaces. As discussed in detail below, the accesses by a particular service are balanced for each subrange across a range of data block addresses by adjusting the area covered by each subrange. Thus, the affinities for subranges across the range are relatively equal after the subranges are adjusted.

A data block is an atomic unit of data that a database server may request to read from and write to a storage device that stores table data in, for example, a block-mode storage device. In order to retrieve a row from a storage device, a data block containing the row is read into memory, and the data block is further examined to determine the row's location within the data block.

A data block may be constrained to a discrete number of physical addresses (i.e., a discrete size) for paging purposes. A data block may comprise data items and header metadata for data block specific information such as transaction history of data items within the data block. In an embodiment, the data items correspond to a set of logically contiguous rows organized into physical columns in row-major format. For example, a data block may contain two rows of data items, R1C1, R1C2, R1C3, R2C1, R2C2, R2C3, and metadata regarding said data items in a discrete number of contiguous memory addresses.

Each data block has a corresponding "master node." The master node coordinates accesses and modification to the particular block and client node. Any node requesting access to the particular block must send a lock request to the master node over the network to obtain required permissions. The master node receives the lock request and send the lock to the requesting node.

Service-Based Access Statistics

Accesses may be tracked using a data structure. A data structure may be divided into slots that are associated with subranges of a range of data block address spaces. Each slot has associated start and end address points (i.e., boundaries). A data block having an address within the boundaries of a particular slot is associated with the particular slot. Slot boundaries can be adjusted to change which data blocks and/or how many data blocks are associated with the slot.

Each service may have a designated "coordinator node." A coordinator node may collect and/or process service-based access statistics cluster-wide for a particular service. The coordinator node creates and/or manages a fixed or variable number of slots in a range of data block address spaces for the particular service. The coordinator node collects aggregate accesses by the particular service to data blocks having addresses that fall within the data block address spaces.

An access by the particular service of a data block may be "associated" with a particular slot if the data block has an address within the boundaries the particular slot. The slot boundaries may be dynamic and updated periodically by the coordinator node. Slot boundaries may be updated in response to particular events. For example, the coordinator node may adjust slot boundaries to balance a number accesses by the particular service aggregated for each slot within a range. That is, each slot within a range may be adjusted to track a relatively equal number of accesses. Because of this, the number of addresses covered by ranges of different slots may be different. The coordinator node manages the slot boundaries and sends slot and boundary information to nodes where the particular service is active.

The use of dynamic slot boundaries may significantly improve cache hit ratio compared to static boundaries For each slot, a slot "access density" by a particular service may be calculated by dividing a total number of accesses, by the particular service of data blocks having addresses within the slot, by a total number of data blocks having addresses within the slot. That is, the access density is a number of accesses per data block for the slot. A slot with a lower access density may cover a larger portion of a range of address spaces than a slot with a higher access density. In an embodiment, data block mastership can be assigned based on access density. For example, the node hosting the service having the highest access density for a particular slot is assigned mastership for the blocks having addresses within the slot. In another example, if a slot has an access density for a particular service at or above a threshold density in steady state, the coordinator node can assign mastership for data blocks having addresses in the slot to a node hosting a service.

The coordinator node may manage slot boundaries based on various algorithms. For example, as demonstrated in the algorithm in Table 1, below, if the coordinator node determines that a first slot within a range has a greater number of accesses by a particular service than a combination of two other adjacent slots within the range, the first slot may be split and/or the other two slots may be merged. Each slot has an index value (e.g., "i", "i+1", etc.) to signify the location of the slot within the range of addresses. The indexes may be updated after slots have been merged and/or split. In this example, the coordinator node may continue to merge and/or split slots until there are no slots in the range with more accesses than any two other slots combined. However, if only a single data block address is contained in a particular slot, the particular slot may not be split even if it has more accesses than two other slots combined.

TABLE 1

Algorithm for managing slots

```
update_slots:
do {
    s_max = s_i with max access count ∀i
    s_min = s_i with least (s_i.accesses + s_{i+1}.accesses) ∀i
    if (s_max.accesses > s_min.accesses + s_{min+1}.acesses)
    {
        Merge s_min and s_{min+1} making s_{min+1} available
        Split s_max in two equal slots and copy second slot to s_{min+1}
        changed = TRUE;
    }
    Else
        changed = FALSE;
} while (changed)
```

FIG. 1 is an illustration of an exemplary method for collecting, managing, and storing service-based access statistics (i.e., statistics collection and management (SCM)), according to embodiments. Steps in the method may be performed at time intervals. At 102, one or more processes access one or more data blocks. When a process accesses a data block, the slot associated with that data block is adjusted. In some cases, a record is generated containing various information, such as data block metadata (e.g., data block address) and the name of the service that made the access request.

At 104, the generated record may be used to update access counts at a node for each block and/or slot by individual services. Each node may collect accesses by the local service corresponding to each slot.

At 106, the node sends the access statistics to a node (e.g., the coordinator node) within a cluster network. The coordinator node uses the records to update and aggregate the statistics cluster-wide at 108. At 110, the coordinator node processes the records and stores the information on persistent shared storage.

Figure 2A:
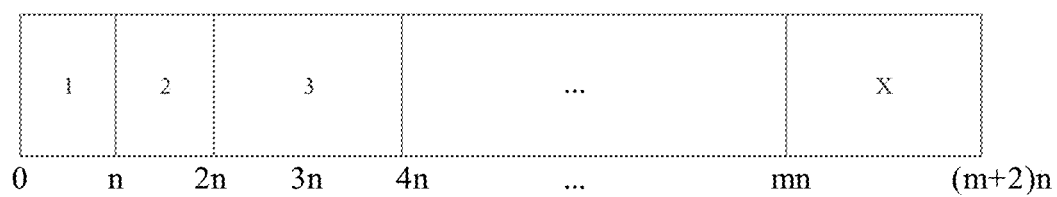
FIGS. 2A and 2B are illustrations of exemplary service-based slot boundaries.
Figure 2B:
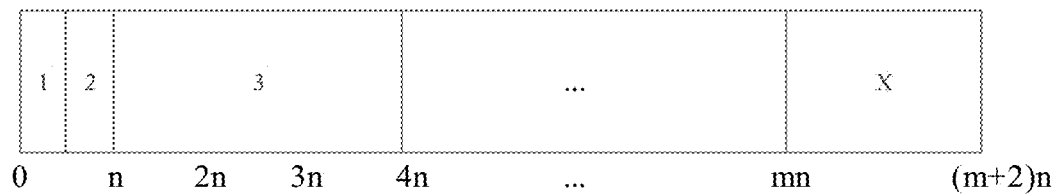

FIGS. 2A and 2B are illustrations of exemplary service-based slot boundaries, according to embodiments. FIGS. 2A and 2B illustrate a data structure (e.g., corresponding to a range of data block addresses extending from 0 to (m+2)n. The data structure in FIG. 2A has slot boundaries at n, 2n, 4n, and mn. These slot boundaries are for exemplary purposes. A data structure may have any number of slot boundaries and the slot boundaries may not necessarily be set according to quantum intervals as illustrated for exemplary purposes in FIG. 2.

Data block accesses for each service may be collected. In an embodiment, this may be performed by a coordinator node. For example, as discussed above, when a service requests access to a particular data block, a record is created and stored. For each service, a range of data block address spaces including multiple data blocks may be divided into slots (i.e., subranges) to balance the number of accesses by the service. For example, with reference to FIG. 2A, data block access statistics may indicate that slot "1" has a greater number of accesses by a particular service than either of slots "2" or "3". In this case, slot "1" may be split and/or slots "2" and "3" may be combined. FIG. 2B illustrates how the data structure may look after being modified.

After the slot boundaries are set, slots "1," "2," and "3" may have an equal or similar number of accesses by the particular service. Because accesses for different services at a data structure may be different, the same data structure may have different slot boundaries for different services.

Figure 3:
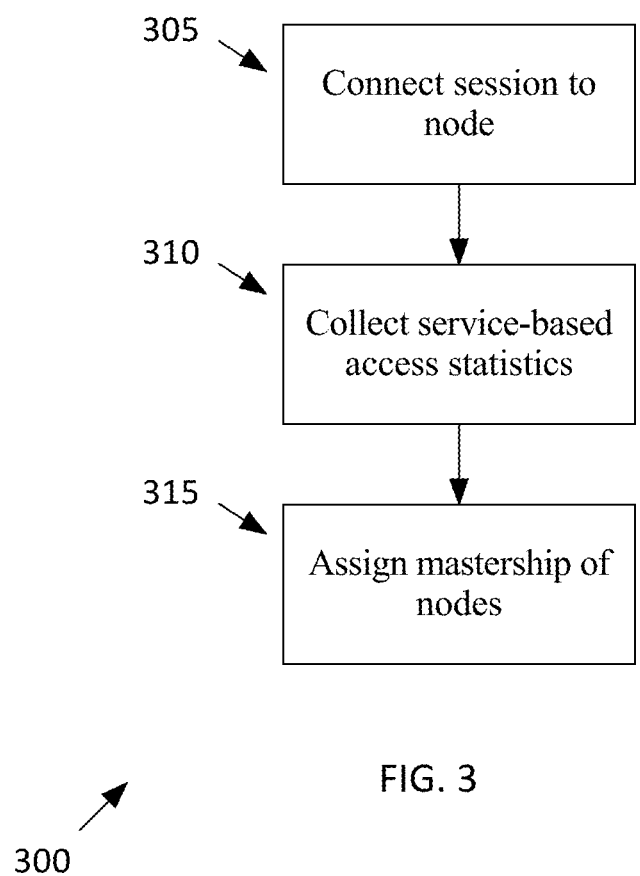
FIG. 3 is a flowchart illustrating a process for assigning mastership of nodes to data blocks.

FIG. 3 a flowchart illustrating a process for assigning mastership of nodes to data blocks, according to embodiments. At step 305, each session of a plurality of sessions connects to a node of a cluster of nodes based on services associated with the plurality of sessions. Each session is associated with a particular service. Thus, a particular service may also be associated with a particular node. In an embodiment, a coordinator node facilitates the connection between the session and the node.

At step 310, service-based access statistics are collected. The service-based access statistics are aggregated by service and ranges of data block addresses and track accesses of particular data blocks by particular services. The data blocks have addresses within the ranges. A range corresponds to one or more contiguous subrange of data block addresses. In an embodiment, a coordinator node collects the service-based access statistics.

At step 315, mastership of the nodes is assigned to the data blocks based on the services associated with the nodes and the service-based access statistics. The service-based access statistics indicate an access density between the services and the subranges of data blocks. If a particular service accesses data blocks having addresses within a particular subrange frequently, the access density between the particular service and the particular subrange may be high. In an embodiment, if the access density between the particular service and the particular subrange is at or above a threshold level, mastership is assigned between the data blocks in the particular subrange and the node associated with the particular service. In another embodiment, whichever service has a highest access density in the particular subrange is assigned mastership of the data blocks having addresses within the subrange. Mastership may be assigned by a coordinator node.

The above steps may be performed in any order and do not necessarily have a causal relationship with each other. In an embodiment, mastership is assigned when a service starts up and/or relocates. That is, assigning mastership may not be done in response to a session connecting to a service. When a service starts up and/or relocates, mastership may be assigned based on previously collected and stored service-based statistics. Mastership can therefore be assigned immediately without the delay of collecting new service-based statistics. Service-based statistics may be collected at any time and may be periodically or otherwise updated to account for changes.

Figure 4:
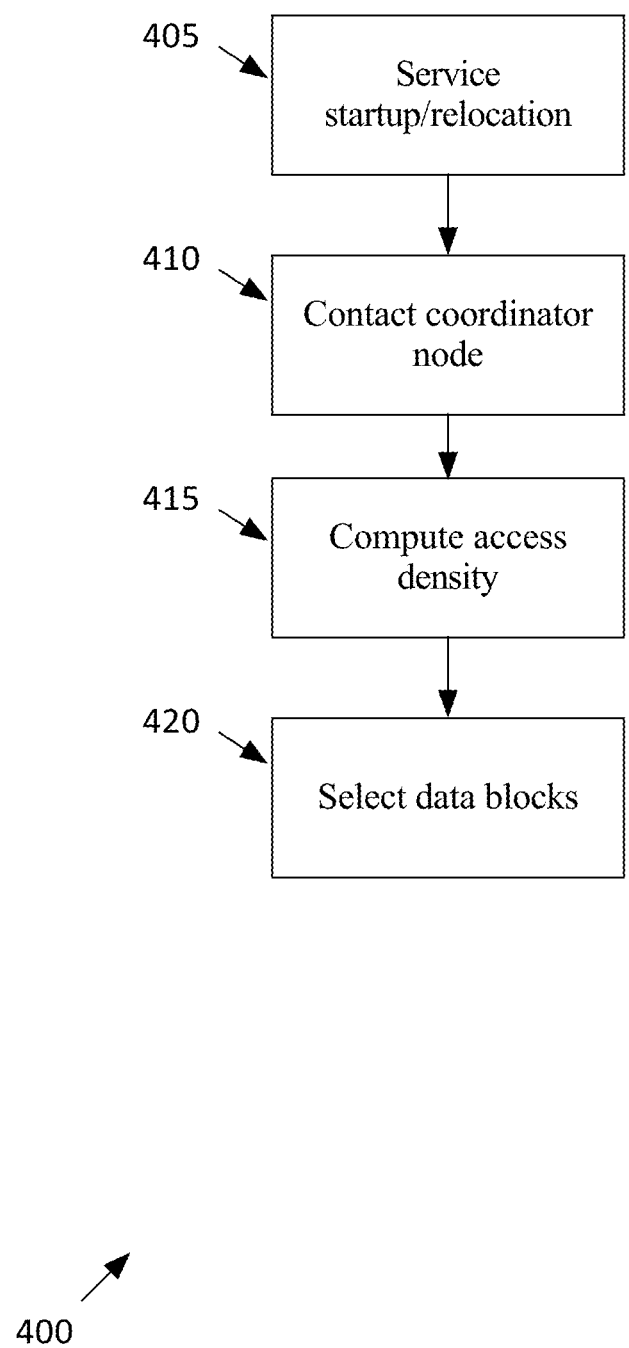
FIG. 4 is a flowchart illustrating a process for warming up a buffer cache.

FIG. 4 is a flowchart illustrating a process for warming up a buffer cache, according to embodiments. At step 405, a service begins a startup or relocation process. The first service has an associated session that is connected to a first node. A service may relocate due to upgrades or maintenance.

At step 410, the first node collects data block access information for the service. The node can collect the block access information from the coordinator node or from shared storage.

At step 415, the coordinator node and/or the first node computes access density between the service and various ranges of data blocks.

At step 420, data blocks are selected to warm up the caches. A service may have access to a buffer cache and/or a flash cache. In an embodiment, the caches are assigned one or more data blocks from each slot in a range of address spaces. Blocks may be assigned randomly from individual slots. The number of blocks assigned for a particular service from each slot may be based on the computed access density for the slot for the particular service. For example, a first slot having a relatively high access density may have one or more data blocks that have been accessed frequently by the particular service. Therefore, many data blocks may be assigned from the first slot to improve a likelihood that a heavily accessed block is assigned. In contrast, a second slot having a relatively low access density with the particular service may have fewer blocks assigned because it is less likely that such blocks have been heavily accessed by the particular service. The number of blocks assigned for each slot may be proportional to the access density of the slot.

In an alternative embodiment, no data blocks from a slot having a low access density may be assigned. For example, a slot having a lowest access density in a range of address spaces may be "ignored" because it is unlikely that any data blocks within the slot have been accessed frequently by a particular service. In such an embodiment, caches are only assigned data blocks from slots that have relatively higher access densities.

In another alternative embodiment, data blocks within a slot having a relatively high number of accesses by a particular service compared to other data blocks having addresses within the slot may be identified and selected to be assigned before other data blocks having a lower number of accesses. In this way, the caches are assigned only the data blocks having relatively higher numbers of accesses. However, because there are many data blocks, assigning data blocks according to a block-by-block comparison may be inefficient. Therefore, as discussed above, data blocks may be assigned randomly from slots. By selecting a higher number of data blocks from slots having higher access densities, there is a strong likelihood of assigning the caches with data blocks having high numbers of accesses without the unnecessary burden on resources of comparing each individual data block. Moreover, by proactively populating the caches based on access densities, service availability may be improved by quickly restoring the caches to steady state and making services available.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
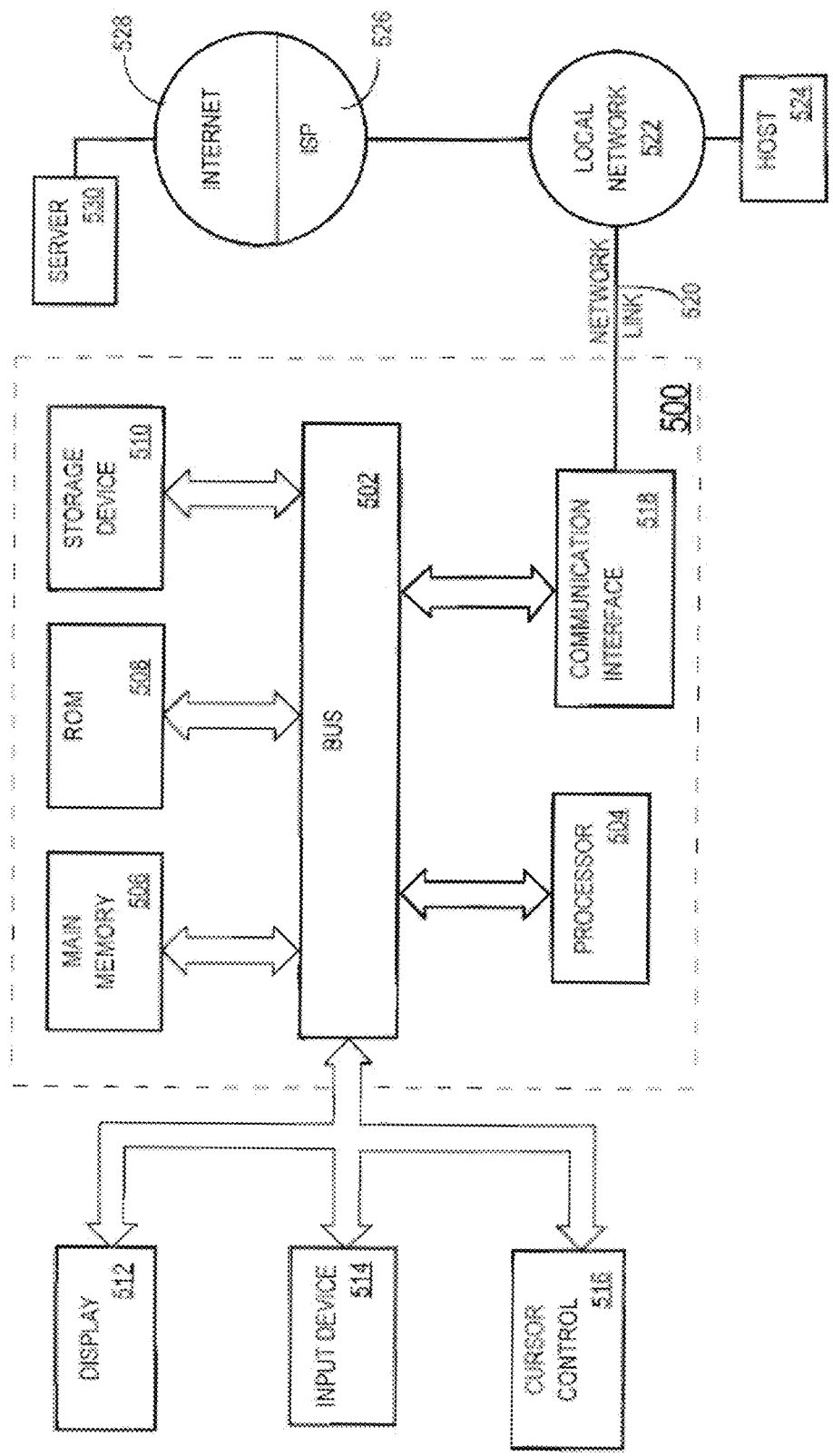
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   each node of a cluster of nodes hosting one or more services of a plurality of services, each node of said cluster of nodes being connected to one or more storage devices that store a plurality of data blocks;
   connecting each session of a plurality of sessions to a respective node of said cluster of nodes;
   wherein each session of said plurality of sessions is associated with a respective service of said plurality of services;
   wherein connecting each session of a plurality of sessions includes connecting said each session to a node of said cluster of nodes hosting the respective service of said each session;
   collecting service-based access statistics aggregated by said plurality of services and by a plurality of subranges of data block addresses of said plurality of data blocks, each subrange of plurality of subranges comprising contiguous data block addresses, wherein for each subrange of said plurality of subranges, said service-based access statistics indicate a number of accesses by one or more services of said plurality of services; for each subrange of said plurality of subranges, assigning mastership of said each subrange to a respective node of said cluster of nodes based on the service-based access statistics and the respective one or more services hosted by the respective node assigned mastership of said each subrange; and
   wherein for each subrange of said plurality of subranges:
   one or more nodes in said cluster of nodes other than the respective node assigned mastership of said each subrange issue lock requests to the respective node for any data block within said each subrange,
   the respective node assigned mastership of said each subrange grants said lock requests to said one or more nodes.

2. The method of claim 1, for a particular service of said plurality of services, adjusting subranges of said plurality of subranges to balance number of accesses aggregated for each subrange of said plurality of subranges.

3. The method of claim 1, further comprising in response to determining that a first subrange of said plurality of subranges has a greater number of accesses than any two subranges of said plurality of subranges combined, splitting the first subrange.

4. The method of claim 1 further comprising in response to determining that a first subrange of said plurality of subranges has a greater number of accesses than two subranges of said plurality of subranges combined, combining the two subranges.

5. A method comprising:
   each node of a cluster of nodes hosting one or more services of a plurality of services,
   each node of said cluster of nodes being connected to one or more storage devices that store a plurality of data blocks;
   connecting each session of a plurality of sessions to a respective node of said cluster of nodes;
   wherein each session of said plurality of sessions is associated with a respective service of said plurality of services;
   wherein connecting each session of a plurality of sessions includes connecting said each session to a node of said cluster of nodes hosting the respective service of said each session;
   collecting service-based access statistics aggregated by said plurality of services and by a plurality of subranges of data block addresses of said plurality of data blocks, each subrange of said plurality of subranges comprising contiguous data block addresses, wherein for each subrange of said plurality of subranges, said service-based access statistics indicate a number of accesses by one or more services of said plurality of services;
   populating caches on said cluster of nodes with some of said plurality of data blocks based on the service-based access statistics and the one or more services hosted by each node of said cluster of nodes.

6. The method of claim 5, wherein populating caches includes populating a cache of a node of said cluster of nodes with data blocks falling within a particular subrange of said plurality of subranges.

7. The method of claim 5, wherein said populating caches is further based on determining a number of accesses per data block for each of the one or more contiguous subranges of data block addresses.

8. The method of claim 5, for a particular service of said plurality of services, adjusting respective subranges of said particular service to balance a number of accesses aggregated for each subrange of said respective subranges.

9. One or more non-transitory computer-readable media storing instructions that, when executed by one or more processors, cause:
   each node of a cluster of nodes hosting one or more services of a plurality of services, each node of said cluster of nodes being connected to one or more storage devices that store a plurality of data blocks;

connecting each session of a plurality of sessions to a respective node of said cluster of nodes;

wherein each session of said plurality of sessions is associated with a respective service of said plurality of services;

wherein connecting each session of a plurality of sessions includes connecting said each session to a node of said cluster of nodes hosting the respective service of said each session;

collecting service-based access statistics aggregated by said plurality of services and by a plurality of subranges of data block addresses of said plurality of data blocks, each subrange of said plurality of subranges comprising contiguous data block addresses, wherein for each subrange of said plurality of subranges, said service-based access statistics indicate a number of accesses by one or more services of said plurality of services;

for each subrange of said plurality of subranges, assigning mastership of said each subrange to a respective node of said cluster of nodes based on the service-based access statistics and the respective one or more services hosted by the respective node assigned mastership of said each subrange; and wherein for each subrange of said plurality of subranges:
one or more nodes in said cluster of nodes other than the respective node assigned mastership of said each subrange issue lock requests to the respective node for any data block within said each subrange,
the respective node assigned mastership of said each subrange grants said lock requests to said one or more nodes.

10. The one or more non-transitory computer-readable media of claim 9, the instructions include instructions that, when executed by said one or more processors, cause for a particular service of said plurality of services, adjusting subranges of said plurality of subranges to balance number of accesses aggregated for each subrange of said plurality of subranges.

11. The one or more non-transitory computer-readable media of claim 9, the instructions include instructions that, when executed by said one or more processors, cause in response to determining that a first subrange of said plurality of subranges has a greater number of accesses than any two subranges of said plurality of subranges combined, splitting the first subrange.

12. The one or more non-transitory computer-readable media of claim 9, the instructions include instructions that, when executed by said one or more processors, cause in response to determining that a first subrange of said plurality of subranges has a greater number of accesses than two subranges of said plurality of subranges combined, combining the two subranges.

13. One or more non-transitory computer-readable media storing instructions that, when executed by one or more processors, cause:
each node of a cluster of nodes hosting one or more services of a plurality of services, each node of said cluster of nodes being connected to one or more storage devices that store a plurality of data blocks;

connecting each session of a plurality of sessions to a respective node of said cluster of nodes;

wherein each session of said plurality of sessions is associated with a respective service of said plurality of services;

wherein connecting each session of a plurality of sessions includes connecting said each session to a node of said cluster of nodes hosting the respective service of said each session;

collecting service-based access statistics aggregated by said plurality of services and by a plurality of subranges of data block addresses of said plurality of data blocks, each subrange of said plurality of subranges comprising contiguous data block addresses, wherein for each subrange of said plurality of subranges, said service-based access statistics indicate a number of accesses by one or more services of said plurality of services;

populating caches on said cluster of nodes with some of said plurality of data blocks based on the service-based access statistics and the one or more services hosted by each node of said cluster of nodes.

14. The one or more non-transitory computer-readable media of claim 13, wherein populating caches includes populating a cache of a node of said cluster of nodes with data blocks falling within a particular subrange of said plurality of subranges.

15. The one or more non-transitory computer-readable media of claim 13, wherein said populating caches includes determining a number of accesses per data block for each of the one or more contiguous subranges of data block addresses.

16. The one or more non-transitory computer-readable media of claim 13, the instructions include instructions that, when executed by said one or more processors, cause for a particular service of said plurality of services, adjusting respective subranges of said particular service to balance a number of accesses aggregated for each subrange of said respective subranges.

* * * * *

UNITED STATES PATENT AND TRADEMARK OFFICE
CERTIFICATE OF CORRECTION

PATENT NO. : 10,853,253 B2
APPLICATION NO. : 15/252076
DATED : December 1, 2020
INVENTOR(S) : Choudhary et al.

Page 1 of 1

It is certified that error appears in the above-identified patent and that said Letters Patent is hereby corrected as shown below:

In the Specification

In Column 6, Line 2, delete "boundaries" and insert -- boundaries. --, therefor.

In Column 6, Line 44, delete "acesses" and insert -- accesses --, therefor.

In the Claims

In Column 11, Line 57, in Claim 1, before "plurality" insert -- said --.

In Column 12, Line 19, in Claim 4, delete "claim 1" and insert -- claim 1, --, therefor.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*